(12) United States Patent
Hales et al.

(10) Patent No.: US 11,441,517 B2
(45) Date of Patent: Sep. 13, 2022

(54) SUPERSONIC JET AIRCRAFT

(71) Applicant: ROLLS-ROYCE plc, London (GB)

(72) Inventors: Michael O Hales, Derby (GB); Stephen J Bradbrook, Derby (GB)

(73) Assignee: ROLLS-ROYCE PLC, London (GB)

( * ) Notice: Subject to any disclaimer, the term of this patent is extended or adjusted under 35 U.S.C. 154(b) by 350 days.

(21) Appl. No.: 16/658,832

(22) Filed: Oct. 21, 2019

(65) Prior Publication Data

US 2020/0132019 A1    Apr. 30, 2020

(30) Foreign Application Priority Data

Oct. 24, 2018  (GB) ..................................... 1817279

(51) Int. Cl.
*B64C 30/00*   (2006.01)
*B64D 27/20*   (2006.01)
(Continued)

(52) U.S. Cl.
CPC ................ *F02K 7/02* (2013.01); *B64C 30/00* (2013.01); *B64D 27/18* (2013.01); *B64D 27/20* (2013.01); *B64D 31/06* (2013.01); *B64D 33/02* (2013.01); *B64D 2033/026* (2013.01); *B64D 2033/0273* (2013.01)

(58) Field of Classification Search
CPC ........ B64C 30/00; B64D 27/20; B64D 33/02; B64D 2033/026; B64D 2033/0273; B64D 2033/0286

See application file for complete search history.

(56) References Cited

U.S. PATENT DOCUMENTS

| | | | | |
|---|---|---|---|---|
| 4,044,973 A | * | 8/1977 | Moorehead | ............ B64D 27/26 244/54 |
| 5,529,263 A | * | 6/1996 | Rudolph | ................. B64C 30/00 244/15 |

(Continued)

FOREIGN PATENT DOCUMENTS

| EP | 1 267 064 A1 | 12/2002 |
|---|---|---|
| EP | 1409343 A2 | 4/2004 |

(Continued)

OTHER PUBLICATIONS

Apr. 9, 2020 Extended Search Report issued in European Patent Application No. 19199194.2.

(Continued)

*Primary Examiner* — Timothy D Collins
*Assistant Examiner* — Terri L Filosi
(74) *Attorney, Agent, or Firm* — Oliff PLC

(57) ABSTRACT

A supersonic jet aircraft and a method of operating the same. The supersonic jet aircraft having at least three turbofan engines and an engine management computer. A first engine of the at least three turbofan engines is configured to be de-activatable during flight to move from an operational state in which it provides thrust to an operational state in which it stops providing thrust. Other engines of the at least three turbofan engines are configured to provide sufficient thrust to the supersonic jet aircraft when the first engine is de-activated such that the aircraft can perform a supersonic climb operation and/or a supersonic cruise operation.

9 Claims, 4 Drawing Sheets

(51) Int. Cl.
    *F02K 7/02*         (2006.01)
    *B64D 27/18*      (2006.01)
    *B64D 31/06*      (2006.01)
    *B64D 33/02*      (2006.01)

(56) References Cited

U.S. PATENT DOCUMENTS

| | | | |
|---|---|---|---|
| 7,107,757 B2 * | 9/2006 | Andre | F02K 1/76 |
| | | | 60/226.2 |
| 2002/0189230 A1 | 12/2002 | Franchet et al. | |
| 2005/0211822 A1 | 9/2005 | Franchet et al. | |
| 2016/0152318 A1 | 6/2016 | Alexander | |
| 2018/0134382 A1 * | 5/2018 | Scholl | B64D 43/00 |

FOREIGN PATENT DOCUMENTS

| | | | |
|---|---|---|---|
| FR | 2 784 960 A1 | | 4/2000 |
| RU | 2632782 C1 | * | 10/2017 |
| WO | 01/53151 A2 | | 7/2001 |

OTHER PUBLICATIONS

Search Report of the Intellectual Property Office of the United Kingdom for GB1817279.1 dated Apr. 8, 2019.

* cited by examiner

SUPERSONIC JET AIRCRAFT

CROSS-REFERENCE TO RELATED APPLICATIONS

This specification is based upon and claims the benefit of priority from United Kingdom patent application number GB 1817279.1 filed on Oct. 24th 2018, the entire contents of which are incorporated herein by reference.

BACKGROUND

Field of the Disclosure

The present disclosure relates to a supersonic jet aircraft and a method of operating the same.

Description of the Related Art

Noise legislation, with respect to modern supersonic jet aircraft, has become more restrictive than was the case previously. Supersonic turbofan engines, of the type to be used in modern supersonic jet aircraft, are likely to be constrained to a minimum bypass ratio and/or maximum specific thrust so as to enable a mixed jet velocity limit that enables acceptable sideline and cutback noise during engine take-off. These legislative constraints will likely set a minimum threshold fan diameter for supersonic turbofan engines at a given thrust.

Conversely, the design requirements for a supersonic turbofan, with respect to supersonic top of climb and supersonic cruise, are the reverse: maximise specific thrust and minimise bypass ratio, whilst maintaining the smallest possible fan diameter in order to facilitate the best drag performance under supersonic conditions. The drag performance is generally a function of the freestream flow capture area, and the wetted area of the nacelle diameter.

The conflict between the two sets of requirements, legislative and design, means that for current and future supersonic noise constraints, the take-off performance constraint on minimum diameter is likely to be the dominant requirement. In particular, the design requirements of supersonic propulsion systems generally mean that the engine core temperatures are throttled back to lower values during maximum take-off conditions than during climb and cruise conditions. This reduces the exhaust jet velocity during take-off conditions relative to climb and cruise conditions, thereby helping to achieve sub-sonic jet noise requirements. Therefore, the supersonic cruise performance of the engine may be poorer than it could be.

Accordingly, there is a desire to provide a supersonic jet aircraft which, whilst complying with the noise legislation pertaining to supersonic jet aircraft, also improves the drag efficiency.

The present disclosure is at least partly based on a realisation that overall performance can be improved by not trying to configure all engines to meet both requirements.

SUMMARY OF THE DISCLOSURE

In a first aspect, the disclosure provides a supersonic jet aircraft having at least three turbofan engines and an engine management computer;

a first engine of the at least three turbofan engines is configured to be de-activatable during flight to move from an operational state in which it provides thrust to an operational state in which it stops providing thrust;

the other engines of the at least three turbofan engines are configured to provide sufficient thrust to the supersonic jet aircraft when the first engine is de-activated such that the aircraft can perform a supersonic climb operation and/or a supersonic cruise operation;

and the engine management computer is configured to: command thrust from the first engine during a subsonic operation of the supersonic jet aircraft; and automatically de-activate the first engine when the subsonic operation is complete.

By providing engines so configured, the supersonic jet aircraft of the first aspect has increased efficiency during supersonic operations. Surprisingly, it was found that the weight cost of configuring the other engines such that they alone provide sufficient thrust to the supersonic jet aircraft to perform the supersonic climb operation and/or supersonic cruise operation can be more than offset by the efficiencies gained by the effective reduction in cross-sectional area achieved by maintaining the first engine in a de-activated state during supersonic operations. Further, by de-activating the first engine during supersonic operations significant weight savings can be achieved in the aircraft structure as mountings and/or load paths arrangements, which would otherwise be necessary, may be avoided. In addition, the first engine does not require a fully supersonic engine installation i.e. its inlet and exhaust arrangement does not need to be suitable for supersonic operations. This can reduce its drag and weight contribution in comparison to a fully supersonic engine.

The supersonic jet aircraft may have any one or, to the extent that they are compatible, any combination of the following optional features.

The first engine may be further configured to be re-activatable during flight to move back to an operational state in which it provides thrust. As such, the supersonic jet aircraft of the first aspect has increased resilience in the case of one or more engine failures. Moreover, should the supersonic jet aircraft transiently require additional thrust (for example, during a dash operation) the first engine can be re-activated. The first engine may be configured such that it can only be re-activated during subsonic operations. There may be more than one de-activatable engine. All the other engines of the at least three turbofan engines may be configured to provide sufficient thrust to the supersonic jet aircraft when the first engine is de-activated such that the aircraft can perform a supersonic climb operation and/or a supersonic cruise operation.

The at least three turbofan engines may be provided in tri-jet configuration. In such a configuration, the first engine may be an engine mounted behind the other engines, e.g. with the other two engines to either side of the first engine when viewed from the front of the aircraft.

The first engine may be mounted within the fuselage of the supersonic jet aircraft. This allows a minimal cross-sectional area change to a given fuselage when the engine is introduced during aircraft aerodynamic design. Such an installation is beneficial for area ruling which is a key contributor to wave drag.

The subsonic operation may include a take-off and/or climb operation. Further, the subsonic operation may include a subsonic dash operation, or a subsonic cruise operation.

The supersonic jet aircraft may have only three turbofan engines.

The supersonic jet aircraft may include one or more doors configured, in a first position, to allow air flow into an inlet of the first engine, and configured, in a second position, to block air flow into the inlet of the first engine. Typically the first position is adopted when the first engine is in an operational state in which it provides thrust, and the second position is adopted when the first engine is in an operation state in which it stops providing thrust.

The air inlet for the first engine may be an S-duct air inlet; a bifurcated air inlet; and/or a pitot air intake.

The at least three turbofan engines may have a common non-dimensional high-pressure compressor size and/or a common fan diameter.

The at least three turbofan engines may be substantially identical. By identical, it may be meant that each engine may be substituted for any of the others with no effect to the available thrust output of the engines as a whole. Advantageously, this can allow the first engine to be swapped with relative ease with any of the other engines. As the first engine is generally used sparingly, this can further increase the reliability of the supersonic jet aircraft.

Each turbofan engine may have a bypass ratio of no more than three.

In a second aspect, the disclosure provides a method of operating the supersonic jet of the first aspect, the method including the steps of:

completing a subsonic operation of the aircraft, in which each of the at least three turbofan engines is operated to obtain thrust therefrom;

de-activating a first of the at least three turbofan engines such that it stops providing thrust; and after the first engine is de-activated, performing a supersonic climb operation and/or a supersonic cruise operation using the thrust obtained from just the remaining operating turbofan engines.

In the second aspect, the supersonic jet may have any, or indeed all, of the optional features of the first aspect insofar as they are compatible with one another.

BRIEF DESCRIPTION OF THE DRAWINGS

Embodiments of the disclosure will now be described by way of example with reference to the accompanying drawings in which.

DETAILED DESCRIPTION OF THE DISCLOSURE

Aspects and embodiments of the present disclosure will now be discussed with reference to the accompanying figures. Further aspects and embodiments will be apparent to those skilled in the art.

Figure 1:
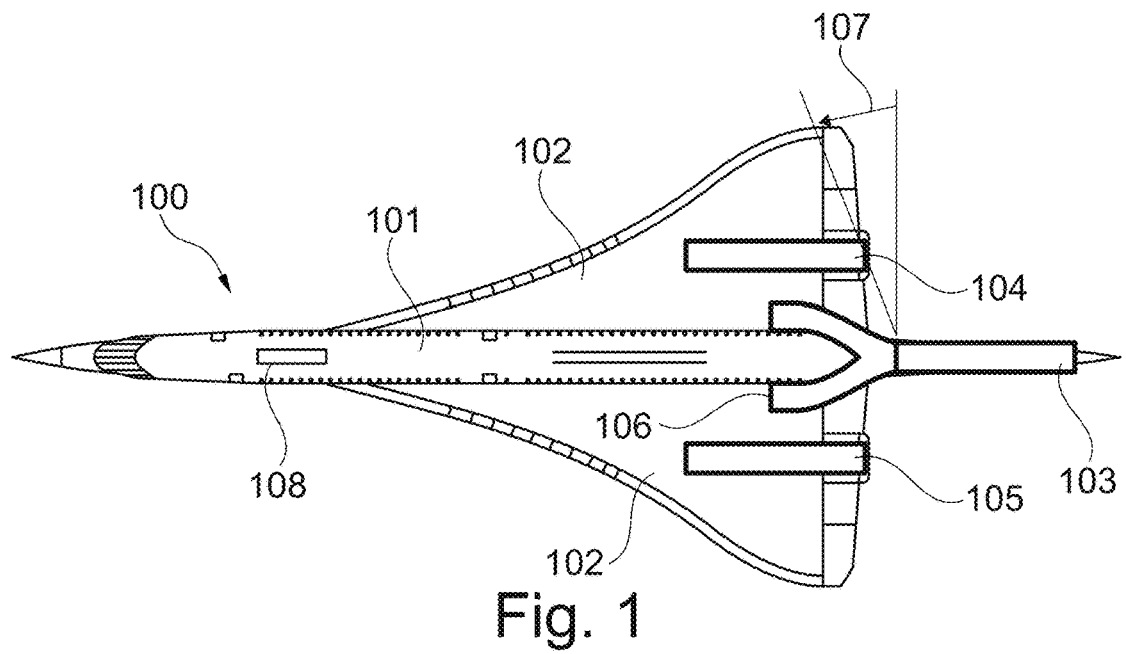
FIG. 1 shows a top-down schematic view of a supersonic jet aircraft.

FIG. 1 shows a top-down schematic view of a supersonic jet aircraft 100. The aircraft includes a fuselage 101, wings 102, and engines 103-105. A first engine 103 is mounted to the fuselage 101 behind engines 104 and 105, which are mounted underneath respective wings.

The aircraft includes an engine management computer (108) that is configured to: command thrust from the first engine during a subsonic operation of the supersonic jet aircraft; and automatically de-activate the first engine when the subsonic operation is complete. The engine management computer can be located at any suitable location of the aircraft.

The first engine 103, has an air inlet 106 also mounted to the fuselage 101. The air inlet in this example is a bifurcated air inlet in that it has two inlet apertures feeding the engine 103. This is seen more clearly in FIG. 2A, which is a front-on schematic view of the aircraft of FIG. 1. As can more clearly be seen, the air inlet 106 has a first inlet aperture 106a and a second inlet aperture 106b, each located on an opposing side of the fuselage 101.

As shown in FIG. 1, the first engine may be positioned rearward from the other engines with a separation angle 107 indicated that minimises any engine to engine debris.

In some examples, the first engine 103 has an air inlet 201 which is an S-duct inlet. This is shown in FIG. 2B. The S-duct inlet 201 has an inlet aperture located above the first engine 103, and mounted in the fuselage 101.

For sharp edged supersonic installations, both an S-duct inlet and a bifurcated inlet are likely to generate more fan face distortion (both pressure induced and generated via swirl). It is advantageous then to decrease the effect these inlets will have. As discussed below, this can be achieved in the present disclosure by de-activating the first engine 103 during flight so that it only has to operate under subsonic conditions, whereby its inlet can be a subsonic inlet.

Figure 2A:
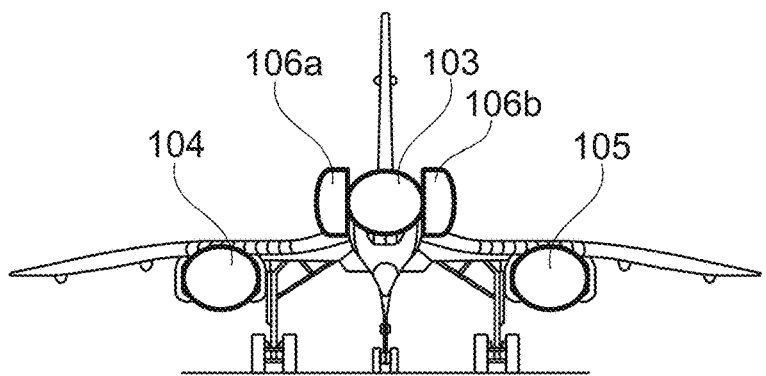
FIG. 2A shows a front-on schematic view of the supersonic jet aircraft of FIG. 1.
Figure 2B:
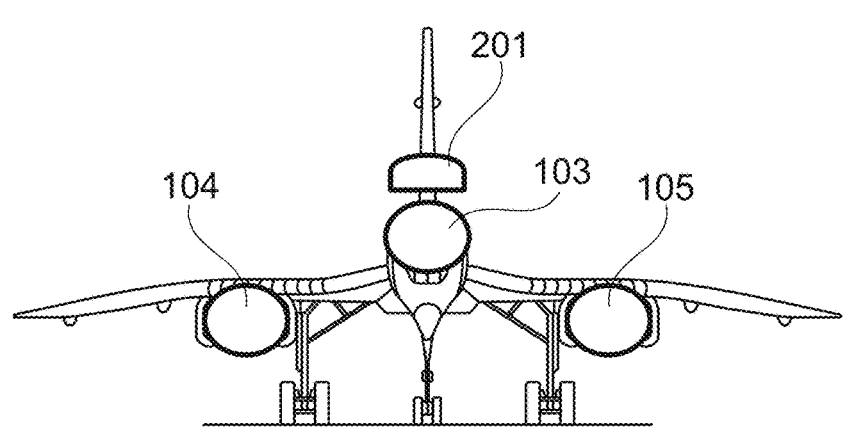
FIG. 2B shows a front-on schematic view of a variant to the supersonic jet aircraft shown in FIG. 1.
Figure 3A:
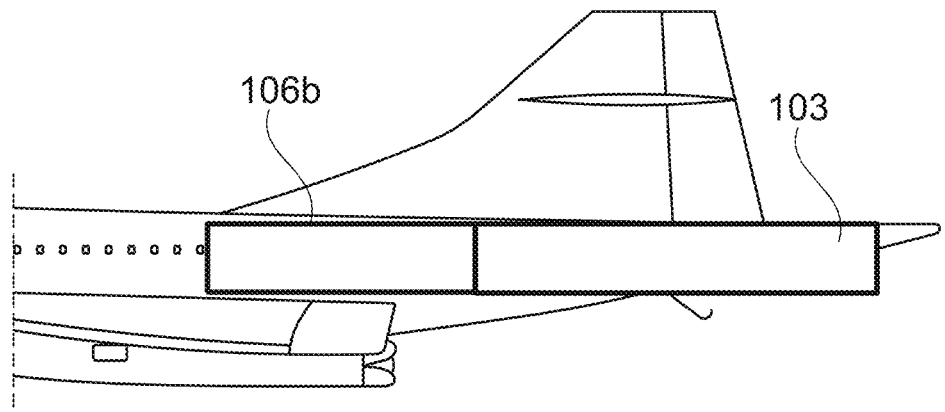
FIG. 3A shows a side-on schematic view of the tail section of the supersonic jet aircraft of FIG. 1.
Figure 3B:
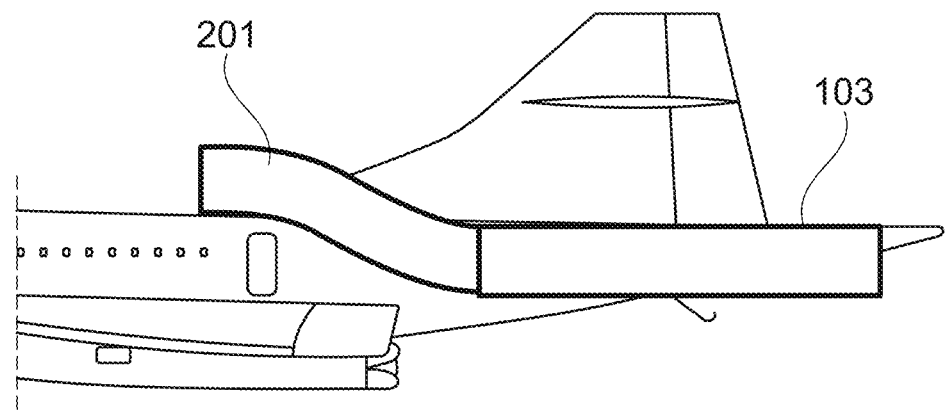
FIG. 3B shows a side-on schematic view of the tail section of the variant supersonic jet aircraft shown in FIG. 2B.

FIG. 3A shows the tail section of the aircraft of FIG. 2A from a side-on perspective. Here, one of the inlet apertures 106b can be seen, providing air to the first engine 103 whilst being substantially in-line with it. In contrast, as shown in FIG. 3B, an S-duct inlet 201 has an inlet aperture located above the first engine 103 relative to the fuselage. The air flows in an S-shaped path, to be provided to the first engine 103. In a different configuration, not shown, the inlet aperture is located below the first engine 103 relative to the fuselage.

During a subsonic operation, the aircraft operates using all three engines. That is to say, all three engines are maintained in an operational state and thereby provide thrust to the aircraft. Conveniently all three engines have a substantially identical configuration. For example, all three engines have a commonly sized engine core and a common fan diameter. When the aircraft finishes the subsonic operation, e.g. has taken-off and/or has completed an initial climb, the first engine 103 is de-activated. The aircraft then performs one or more supersonic operations, for example a supersonic climb operation or a supersonic cruise operation.

The engines are configured such that engines 104 and 105 can, by themselves, allow the aircraft to perform these supersonic operations. Thus the engines are over-sized for take-off requirements from a core temperature and flow perspective such that only two engines are required for the supersonic climb or cruise operations.

In one example, each engine has a main engine fan diameter of 1534 mm (60.4"), and a bypass ratio of 2.82, which gives a supersonic effective engine face area of 3.697 $m^2$ (5731 $in^2$) across the two active engines when the first engine is de-activated. The subsonic effective engine face area across all three engines, by contrast, can be around 5.546 $m^2$ (8596 $in^2$).

In a comparative configuration providing similar levels of performance but in which all three engines operate both in sub- and supersonic operations the engine fan diameter could be about 1584 mm (62.4"), the bypass ratio could be 3.52, and the non-dimensional high-pressure compressor size could be 66% of that of the aforementioned engine. Such a configuration would have a supersonic effective cross-sectional area of 5.919 m$^2$ (9175 in$^2$), and a subsonic effective cross-sectional area of the same.

Therefore, it can be seen that a configuration according to the present disclosure can offer a reduction in supersonic effective cross-sectional area of approximately 38%.

Similarly, a configuration according to the present disclosure offers a reduction in subsonic effective cross-sectional area of approximately 6.3%. The non-dimensional high-pressure compressor size=(W26*SQRT(T30))/P30, where W26 is the inlet flow rate of air in lbm/s to the compressor, T30 is the exit temperature of the high-pressure compressor in Kelvin, and P30 is the exit pressure of the high-pressure compressor in lbs/sq.in.

These engines sizes are intended to meet expected noise requirements. Such engines must generally be conditioned to meet a subsonic Mach number of the order of 0.4 to 0.6 for typical fan inlet Mach numbers. Comparing the example configuration according to the present disclosure to the comparative configuration in which all three engines operate, it can be observed that the bypass ratio has reduced from 3.52 to 2.82, and the non-dimensional high-pressure compressor size has increased significantly by a factor of about 1.5 multiple to account for the increased supersonic power requirement when the de-activatable engine is de-activated.

It was also found that the sizing of the engines in configurations according to the present disclosure can improve the supersonic climb and supersonic cruise specific fuel consumptions. This is due to improved component matching during supersonic operations when the bypass ratio is decreased/specific thrust is increased. This results in improved positioning of the cruise condition on the component characteristics relative to the other flight conditions, and can be observed by a higher low-pressure spool speed required for a cycle for a given fan diameter at common altitude and airframe thrust demand conditions. This allows for improved fan efficiency relative to the configuration with no de-activatable engines.

It was further found that the core mass increase across all three engines, to account for only two being used for supersonic operations, could be offset by the simplification of the subsonic-only installation for the de-activatable engine on the aircraft. Only a basic installation for the de-activatable engine is required as it is only used during subsonic flight operations. Moreover, as a result, some elements of supersonic installations can be avoided. In particular, as already mentioned above, the de-activatable engine can have a simplified (nonsupersonic) inlet. There is also likely to be no requirement for a variable exhaust nozzle (used during supersonic operations) in the de-activatable engine. Indeed, for take-off roll climb-out and subsonic climb it is likely that the engine can be operated with fixed final nozzle areas.

The reduction in contribution of these items to supersonic drag also significantly reduces the wetted area and wave drag contributions from the turbofan engines in supersonic cruise.

Additionally, significant weight can be saved on the aircraft structure as a result of the removal or simplification of mounting and load path arrangements generally needed for supersonic installations. Subsonic capable inlets are much more readily integrated into the fuselage lofted shape for supersonic jet aircraft, and therefore flow direction passage devices such as bifurcations and S-ducts can either be removed entirely or significantly simplified.

Thus whilst there is a weight penalty due to the core compressor, combustor, and turbine(s) being over-sized to meet a higher supersonic climb and cruise thrust requirement, this can be more than balanced by the advantages discussed above.

A further significant advantage of the configuration of the present disclosure is the ability to have only one type of turbomachinery for all three of the engines. Advantageously, this can allow the first engine to be swapped with relative ease with any of the other engines. As the first engine is generally used sparingly, this can further increase the reliability of the supersonic jet aircraft.

Removal of the supersonic installation for the de-activatable engine, leaving only a single style for the non-de-activatable engines, can also reduce the variety of distortion conditions which the engine type may need to be adapted for. This can allow for improved fan efficiency or the adaptation of a fan with a lower baseline surge margin.

Figure 4:
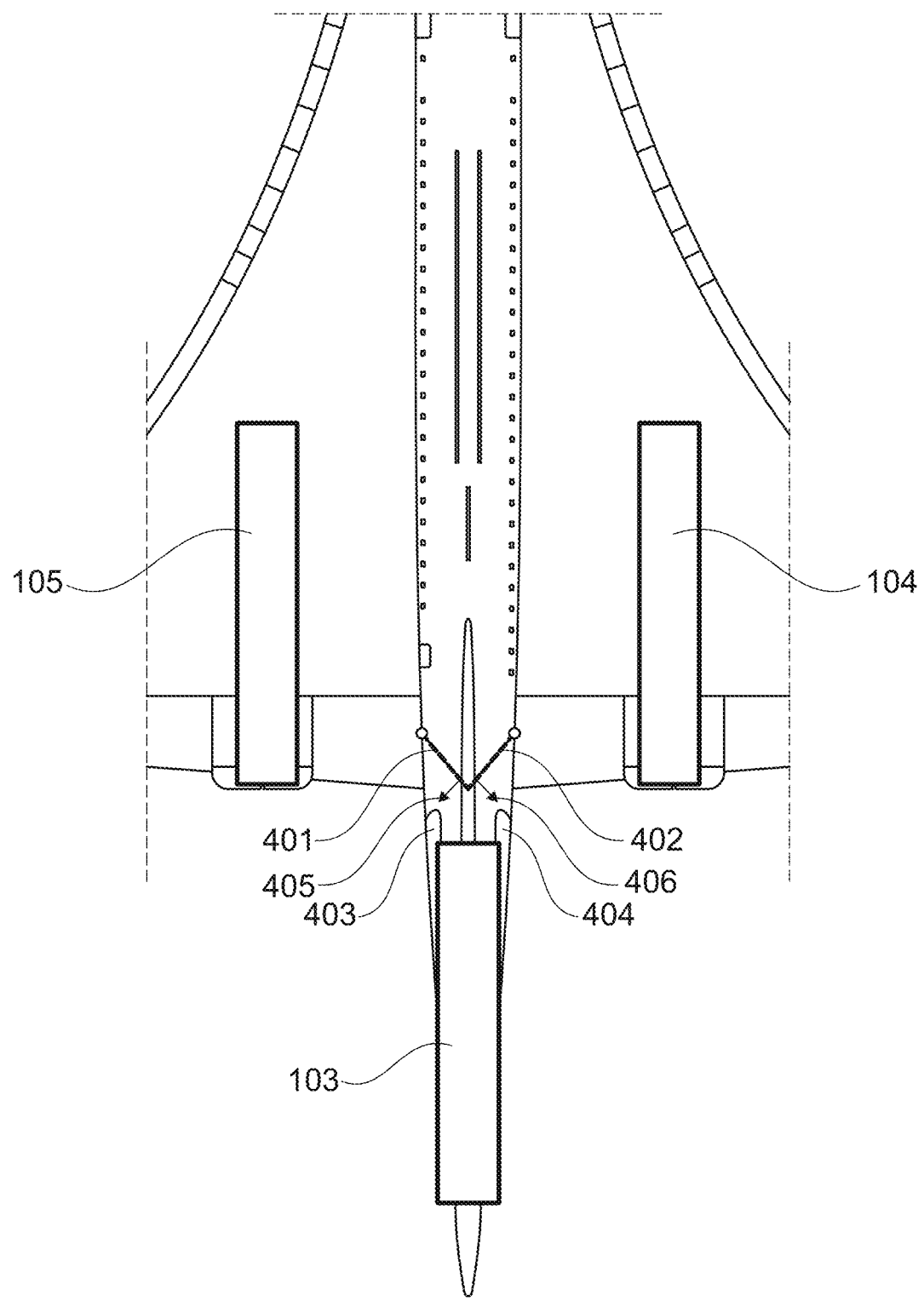
FIG. 4 shows a top-down schematic view of a variant of the supersonic jet aircraft of FIG. 1.

FIG. 4 shows a top-down schematic of a further variant of the supersonic jet aircraft including a pair of doors 401 and 402, which are moveable between a first position, in which air flows into an air inlet of the first engine 103, and a second position in which air is blocked from flowing into the inlet of the first engine 103. The dotted lines indicate the open position of the doors 401, 402 whereby air cannot flow into pitot intakes 403 and 404 respectively. The doors close by moving in the direction indicated by arrows 405 and 406 respectively, so that the doors form an inlet for their respective pitot intakes. In the closed position, the doors generally align with an exterior of the fuselage when in plan view.

A hinge is connected to each door at a point distal to the respective pitot intake, and a seal is provided at a point proximal to each respective pitot intake.

The doors, when open, provide a continuous aerodynamic surface on an exterior of the fuselage, and so decrease deleterious effects due to drag. This can be particularly beneficial to wave drag which is a function of discontinuities in the lofted cross sectional area of the aircraft.

Figure 5:
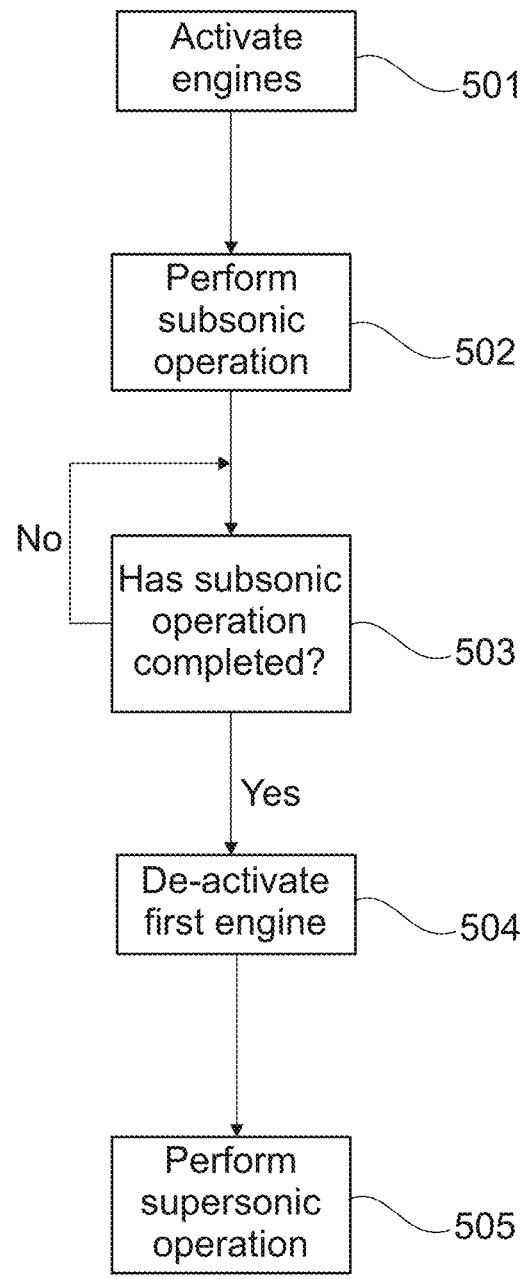
FIG. 5 shows a flow diagram for operating a supersonic jet aircraft.

FIG. 5 shows a flow diagram for operating the supersonic jet aircraft. In a first a step, 501, the first engine (mounted to the fuselage) and the remaining engines (mounted to the wings) are activated. Subsequently, in step 502, the supersonic jet aircraft performs one or more subsonic operations. For example, the aircraft may take-off, climb, and achieve a subsonic cruise. A check is performed, in step 503, to ascertain whether the subsonic operation has completed.

When the subsonic operation has completed the first engine is de-activated, as shown in step 504. The supersonic jet aircraft then performs one or more supersonic operations in step 505. For example the supersonic jet aircraft may perform a supersonic climb, a transonic operation, or a supersonic cruise.

It will be understood that the disclosure is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

We claim:

1. A supersonic jet aircraft comprising:
   at least three turbofan engines that each have identical turbofan engine cores, the at least three turbofan engines being configured to provide thrust to the supersonic jet aircraft to perform subsonic flight operations and two of the at least three turbofan engines being configured to provide supersonic flight operations, the at least three turbofan engines including:
      a first engine configured to be de-activatable during flight to move from a first operational state in which the first engine provides thrust to a second operational state in which the first engine stops providing thrust, the first engine having a non-supersonic inlet, and
      the other engines of the at least three turbofan engines configured to provide thrust to the supersonic jet aircraft when the first engine is de-activated such that the supersonic jet aircraft performs a supersonic climb operation or a supersonic cruise operation; and
   an engine management computer configured to:
      command thrust from the first engine during the subsonic flight operations of the supersonic jet aircraft; and
      automatically de-activate the first engine when the subsonic flight operations are complete.

2. The supersonic jet aircraft of claim 1, wherein the first engine is further configured to be re-activatable during flight to move back to the first operational state in which the first engine provides thrust.

3. The supersonic jet aircraft of claim 1, wherein the at least three turbofan engines are provided in a tri-jet configuration.

4. The supersonic jet aircraft of claim 1, wherein the first engine is mounted within a fuselage of the supersonic jet aircraft.

5. The supersonic jet aircraft of claim 1, wherein only three turbofan engines are included.

6. The supersonic jet aircraft of claim 1, further comprising one or more doors configured to:
   in a first position, allow air flow into an inlet of the first engine, and
   in a second position, block air flow into the inlet of the first engine.

7. The supersonic jet aircraft of claim 1, wherein an air inlet for the first engine is an S-duct air inlet, a bifurcated air inlet, or a pitot air intake.

8. The supersonic jet aircraft of claim 1, wherein each of the at least three turbofan engines has a bypass ratio of no more than 3.

9. A method of operating the supersonic jet aircraft of claim 1, the method including the steps of:
   completing a subsonic flight operation of the supersonic jet aircraft, in which each of the at least three turbofan engines is operated to obtain thrust therefrom;
   de-activating the first engine of the at least three turbofan engines such that the first engine stops providing thrust; and
   after the first engine is de-activated, performing a supersonic climb operation or a supersonic cruise operation using the thrust obtained from only the remaining operating turbofan engines.

* * * * *